United States Patent
Zheng et al.

(10) Patent No.: US 8,490,981 B2
(45) Date of Patent: Jul. 23, 2013

(54) BRUSH SEAL

(75) Inventors: Xiaoqing Zheng, Niskayuna, NY (US);
William Edward Adis, Scotia, NY (US);
Michael Dennis Mack, Ballston Spa, NY (US)

(73) Assignee: General Electric Company, Schenectady, NY (US)

( * ) Notice: Subject to any disclaimer, the term of this patent is extended or adjusted under 35 U.S.C. 154(b) by 335 days.

(21) Appl. No.: 12/710,443

(22) Filed: Feb. 23, 2010

(65) Prior Publication Data

US 2011/0204573 A1 Aug. 25, 2011

(51) Int. Cl.
*F16J 15/44* (2006.01)

(52) U.S. Cl.
USPC .................................................. 277/355

(58) Field of Classification Search
USPC .......................... 277/355, 411, 412
See application file for complete search history.

(56) References Cited

U.S. PATENT DOCUMENTS

| | | | | |
|---|---|---|---|---|
| 5,794,942 | A * | 8/1998 | Vance et al. | 277/303 |
| 5,799,952 | A | 9/1998 | Morrison et al. | |
| 6,367,806 | B1 | 4/2002 | Turnquist et al. | |
| 6,669,203 | B1 * | 12/2003 | Mortzheim | 277/355 |
| 7,255,352 | B2 | 8/2007 | Adis et al. | |
| 7,604,242 | B2 * | 10/2009 | Adis et al. | 277/355 |
| 7,938,403 | B1 * | 5/2011 | Pandey et al. | 277/355 |
| 8,028,996 | B2 * | 10/2011 | Ruggiero et al. | 277/355 |
| 2006/0214378 | A1 * | 9/2006 | Zheng | 277/355 |
| 2007/0069475 | A1 | 3/2007 | Adis et al. | |
| 2008/0001363 | A1 * | 1/2008 | Bhate | 277/355 |
| 2008/0029968 | A1 * | 2/2008 | Addis | 277/355 |
| 2008/0061513 | A1 * | 3/2008 | Awtar et al. | 277/355 |
| 2010/0001473 | A1 * | 1/2010 | Crudgington et al. | 277/355 |
| 2010/0032908 | A1 * | 2/2010 | Bowsher et al. | 277/411 |
| 2011/0121519 | A1 * | 5/2011 | Justak | 277/412 |

FOREIGN PATENT DOCUMENTS

| | | |
|---|---|---|
| EP | 0979963 A2 | 2/2000 |
| WO | 01/55625 A1 | 8/2001 |

OTHER PUBLICATIONS

European Search Report and Opinion for EP Application No. 11155559.5 dated Jul. 4, 2011, 6 pages.

* cited by examiner

*Primary Examiner* — Thomas Beach
*Assistant Examiner* — Eugene G Byrd
(74) *Attorney, Agent, or Firm* — Hoffman Warnick LLC; Ernest G. Cusick

(57) ABSTRACT

A brush seal, brush seal segment, and brush seal backplate for use in a rotary device are provided. In one embodiment, the invention provides a brush seal for a rotary device, the brush seal comprising: a plurality of brush seal segments, each segment including: an arcuate fence; an arcuate backplate circumferentially coextensive with the arcuate fence, the arcuate backplate including: a plurality of circumferentially-oriented cavities; a first dam along a first end of the arcuate backplate, the first dam substantially closing an end of at least one of the plurality of circumferentially-oriented cavities; and a second dam along a second end of the arcuate backplate, the second dam substantially closing an end of at least one of the plurality of circumferentially-oriented cavities; a plurality of brush bristles between the arcuate backplate and the arcuate fence; and a static member to which at least one of the plurality of brush seal segments is affixed.

19 Claims, 5 Drawing Sheets

BRUSH SEAL

BACKGROUND OF THE INVENTION

Embodiments of the invention relate generally to brush seals and, more particularly, to a segmented brush seal, wherein each segment includes a dam along a first end and a second end for improving pressure balance.

Known segmented brush seals typically include circumferentially-oriented cavities in their backplates in order to balance pressures encountered during operation of the rotary device of which it is a part. In such designs, however, some of the circumferentially-oriented cavities will remain open along an end of the brush seal segment. As such, leakage is observed along the ends of the brush seal segments, reducing the effectiveness of the pressure balance features of the seal. In addition, greater wear of the brush bristles is found along such ends of the brush seal segments due to less pressure balance and greater disturbances from leaking flow.

BRIEF DESCRIPTION OF THE INVENTION

A brush seal, brush seal segment, and brush seal backplate for use in a rotary device are provided.

In one embodiment, the invention provides a brush seal for a rotary device, the brush seal comprising: a plurality of brush seal segments, each segment including: an arcuate fence; an arcuate backplate circumferentially coextensive with the arcuate fence, the arcuate backplate including: a plurality of circumferentially-oriented cavities; a first dam along a first end of the arcuate backplate, the first dam substantially closing an end of at least one of the plurality of circumferentially-oriented cavities; and a second dam along a second end of the arcuate backplate, the second dam substantially closing an end of at least one of the plurality of circumferentially-oriented cavities; a plurality of brush bristles between the arcuate backplate and the arcuate fence; and a static member to which at least one of the plurality of brush seal segments is affixed.

In another embodiment, the invention provides a brush seal segment comprising: an arcuate fence; an arcuate backplate circumferentially coextensive with the arcuate fence, the arcuate backplate having: a plurality of circumferentially-oriented cavities; a first dam along a first end of the arcuate backplate, the first dam substantially closing an end of at least one of the plurality of circumferentially-oriented cavities; a second dam along a second end of the arcuate backplate, the second dam substantially closing an end of at least one of the plurality of circumferentially-oriented cavities; and a plurality of brush bristles between the arcuate backplate and the arcuate fence.

In still another embodiment, the invention provides an arcuate backplate for a brush seal segment comprising: a first end; a second end; an inner arcuate edge between the first end and the second end; an outer arcuate edge between the first end and the second end; at least one circumferentially-oriented cavity between the inner arcuate edge and the outer arcuate edge; a first dam along the first end, the first dam substantially closing an end of the at least one circumferentially-oriented cavity; and a second dam along the second end, the second dam substantially closing an end of the at least one circumferentially-oriented cavity.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
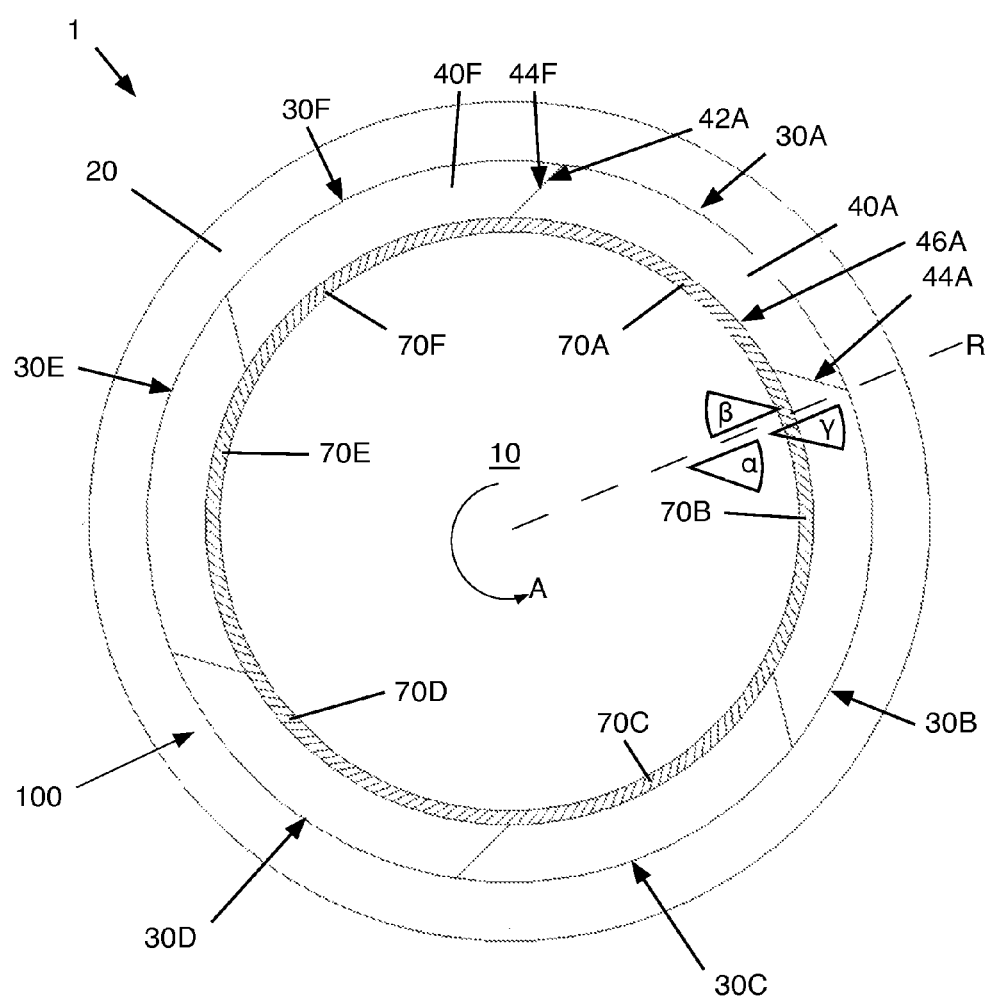
FIG. 1 shows a cross-sectional view of a rotary device having a brush seal and a rotor.

Turning now to the drawings, FIG. 1 shows a cross-sectional view of a rotary device 1 (e.g., gas turbine, steam turbine, generator, etc.) comprising a rotor 10 surrounded by a substantially circular static member 20 and a brush seal 100 therebetween. Brush seal 100 includes a plurality of segments 30A, 30B, 30C, 30D, 30E, 30F, one or more of which may be affixed to static member 20. Such a brush seal may include any number of segments, typically between two and 12 segments. For the sake of clarity, the segments will be described further with respect only to segment 30A.

Each segment 30A includes an arcuate fence 40A, an arcuate backplate (shown in subsequent figures and described further below), and a plurality of brush bristles 70A. The plurality of brush bristles 70A are disposed between fence 40A and the backplate, and extend beyond an inner arcuate edge 46A of fence 40A, such that the brush bristles 70A may seal against rotor 10 as it rotates along path A.

As can be seen in FIG. 1, brush bristles 70A are angled at an angle α relative to a radial axis R of rotor 10, segment 30A, and static member 20. Similarly, a first end 42A and second end 44A of fence 40A are angled at an angle β and an angle γ, respectively, with respect to radial axis R. Although not essential, angles α, β, and γ are typically the same. Such angles may range, for example, from about 0° (i.e., along radial axis R) to about 60°. As one skilled in the art will recognize, of course, in order for adjacent segments of brush seal 100 to properly align and provide a functional seal, a first end (e.g., 42A) of a first fence (e.g., 40A) must have an angle, if any, substantially the same as an angle of a second end (e.g., 44F) of an adjacent second fence (e.g., 40F).

Figure 2:
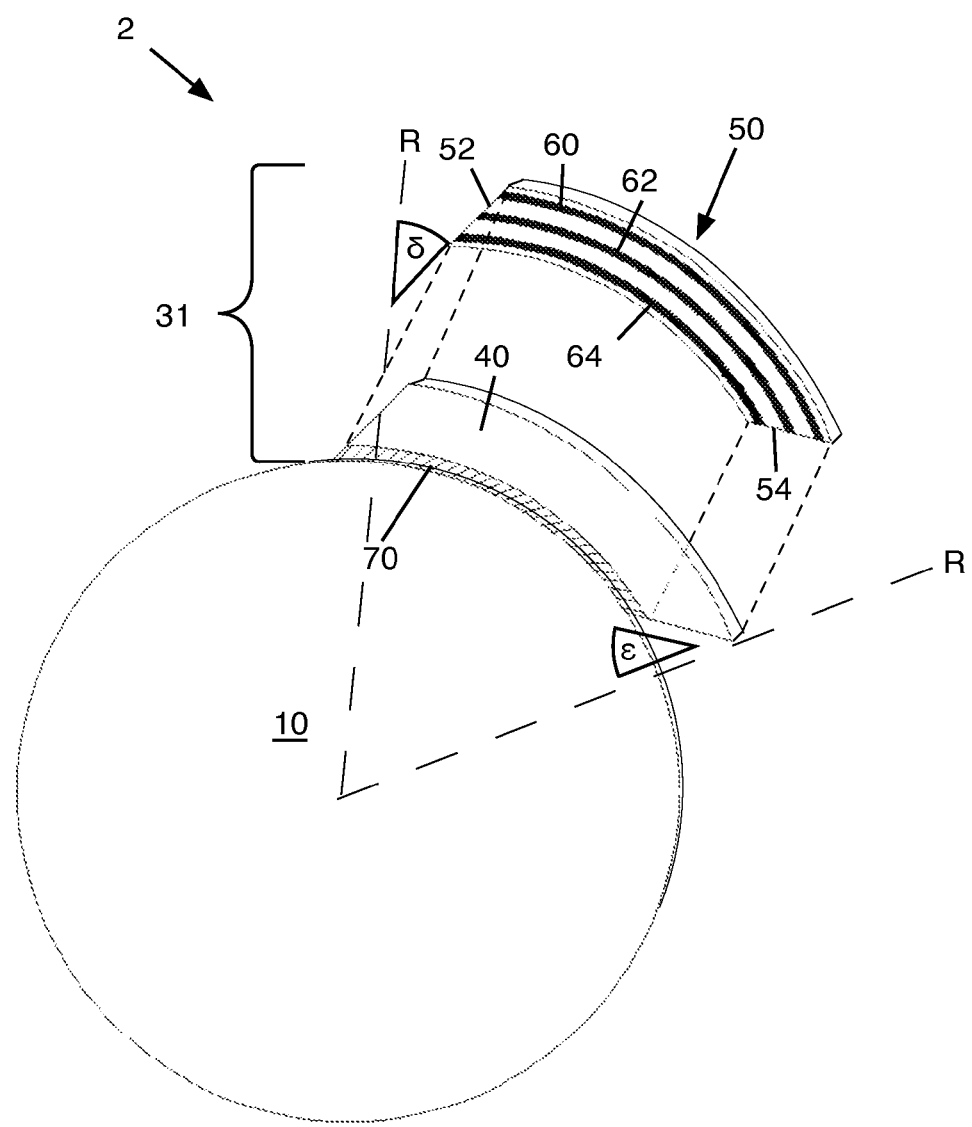
FIG. 2 shows a partially-exploded cross-sectional view of a known brush seal and rotor.

FIG. 2 shows a partially-exploded cross-sectional view of portions of a known rotary device 2. For the sake of clarity, only a single segment 31 is shown and described. It should be understood, however, that rotary device 2 would include a plurality of segments. As can be seen, arcuate backplate 50 is now shown and is circumferentially coextensive with fence 40.

Backplate 50 includes an outer circumferentially-oriented cavity 60, an inner circumferentially-oriented cavity 64, and a middle circumferentially-oriented cavity 62 therebetween. Circumferentially-oriented cavities 60, 62, 64 provide pressure-balancing along backplate 50. However, as noted above, in known devices, one or more of circumferentially-oriented cavities 60, 62, 64 are open at a first end 52 and/or a second end 54 of backplate 50, resulting in both increased leakage (and an attendant decrease in efficiency of rotary device 2)

and increased wear and/or damage to brush bristles 70 due to less pressure-balance in the inter-segment area.

Figure 3:
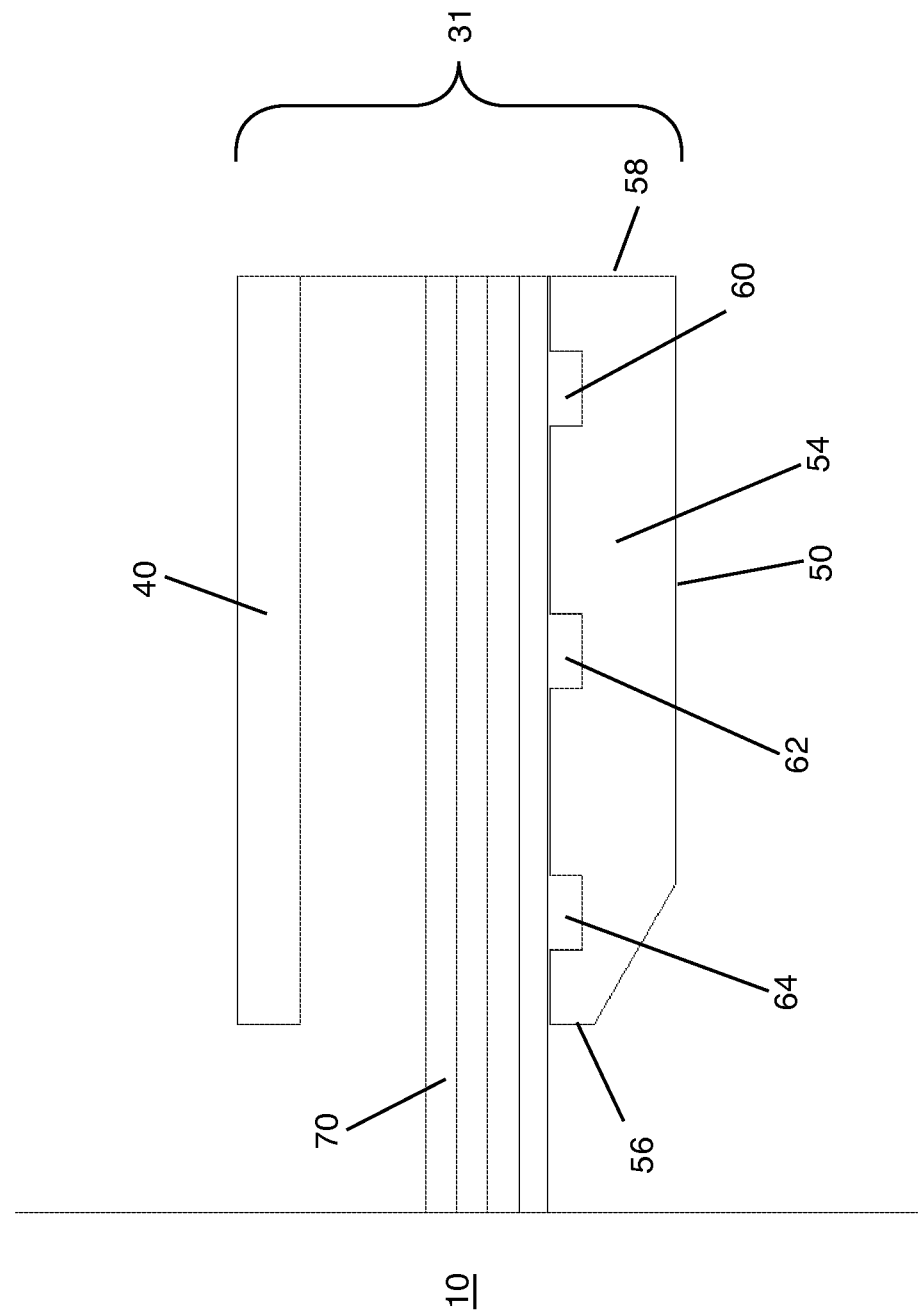
FIG. 3 shows a cross-sectional side view of the known brush seal and rotor of FIG. 2.

FIG. 3 shows a cross-sectional side view of segment 31 of FIG. 2 and a portion of rotor 10. Outer circumferentially-oriented cavity 60, middle circumferentially-oriented cavity 62, and inner circumferentially-oriented cavity 64 can be seen along second end 54 because, as noted above, each is open at second end 54, as in known devices.

Figure 4:
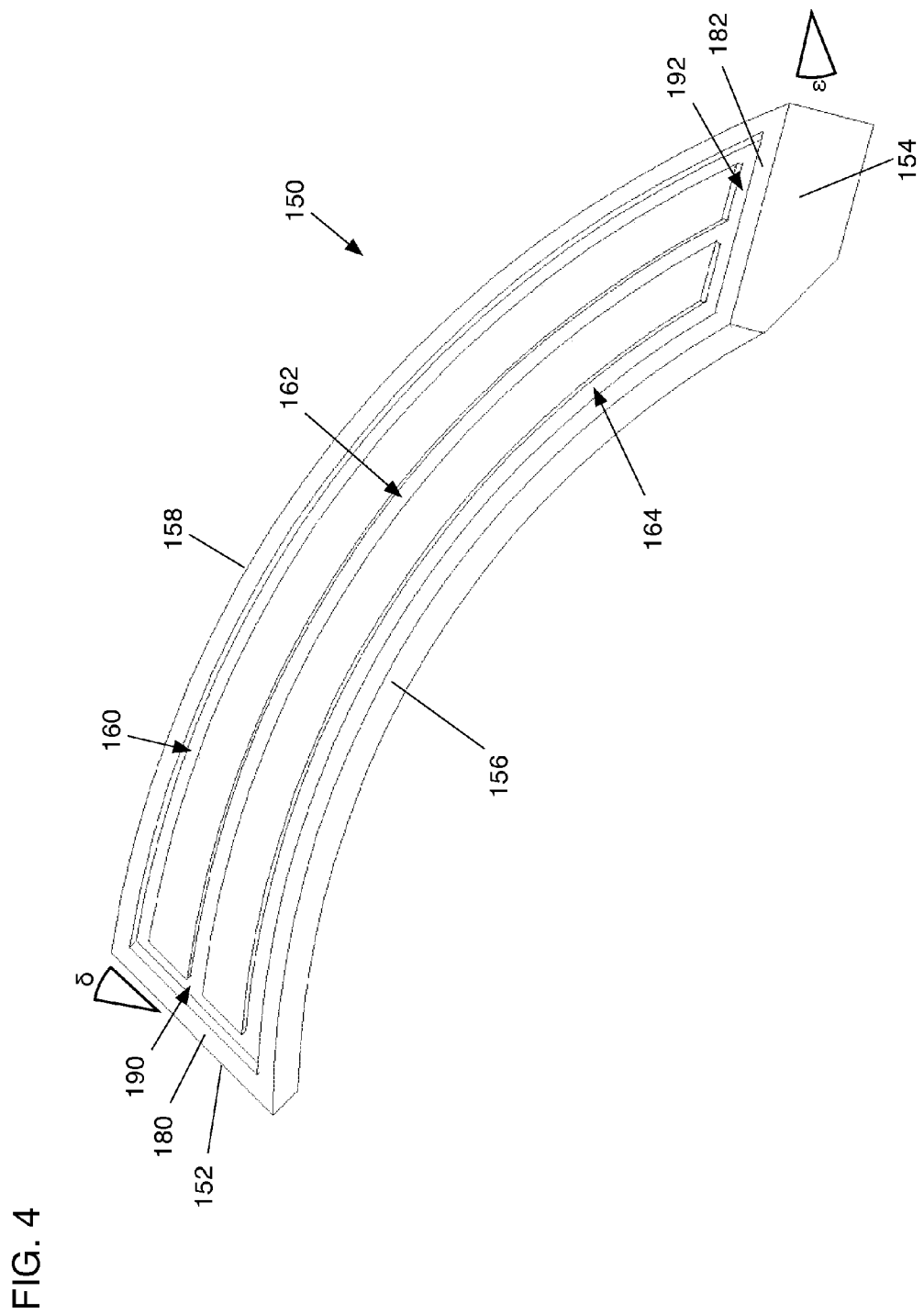
FIG. 4 shows a perspective view of a backplate of a brush seal according to an embodiment of the invention.

FIG. 4 shows a perspective view of a backplate 150 according to an embodiment of the invention. As can be seen in FIG. 4, backplate 150 includes a first dam 180 along first end 152 and a second dam 182 along second end 154. As will be described in greater detail below and as shown in the figures herein, first dam 180 and second dam 182 reduce leakage as well as wear and/or damage to brush bristles 170 along first end 152 and second end 154.

In the embodiment shown in FIG. 4, backplate 150 also includes a first groove 190 substantially parallel to first end 152 and adjacent first dam 180, and a second groove 192 substantially parallel to second end 154 and adjacent second dam 182. First groove 190 and second groove 192, as shown in FIG. 4, are continuous with outer circumferentially-oriented cavity 160, middle circumferentially-oriented cavity 162, and inner circumferentially-oriented cavity 164, thereby maintaining communication between the circumferentially-oriented cavities 160, 162, 164 and improving pressure-balance along backplate 150.

Figure 5:
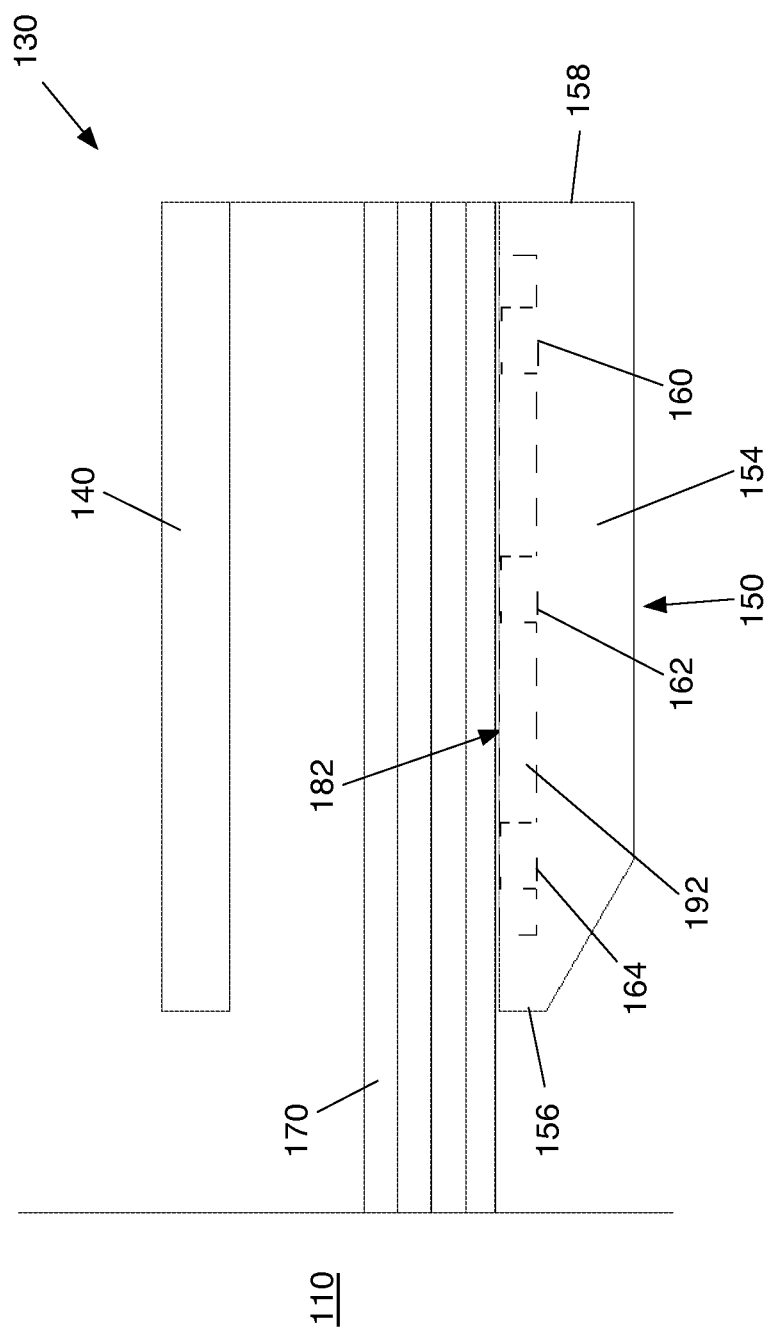
FIG. 5 shows cross-sectional side view of a brush seal segment according to an embodiment of the invention.

FIG. 5 shows a cross-sectional side view of a brush seal segment 130 including a backplate 150 such as that of FIG. 4. As can be seen, circumferentially-oriented cavities 160, 162, 164 (shown in phantom) are not open at second end 154. Rather, second dam 182 forms a substantially continuous surface along second end 154. Circumferentially-oriented cavities 160, 162, 164 are shown as intersecting second groove 192 (also shown in phantom), as described above.

Returning to FIG. 4, it can be seen that first groove 190 and second groove 192 are continuous with each circumferentially-oriented cavity 160, 162, 164. It should be noted, however, that each of first groove 190 and second groove 192 need not be continuous with each circumferentially-oriented cavity 160, 162, 164. For example, in other embodiments, first groove 190 may be continuous only with outer circumferentially-oriented cavity 160 and second groove 192 continuous with middle circumferentially-oriented cavity 162 and inner circumferentially-oriented cavity 164. Other permutations are possible, of course, as will be recognized by one skilled in the art.

Similarly, while the embodiments shown above describe a backplate 150 having three circumferentially-oriented cavities 160, 162, 164, more or fewer such cavities may be employed in other embodiments of the invention. In addition, the circumferentially-oriented cavities employed need not extend from first groove 190 to second groove 192. That is, in some embodiments, one or more circumferentially-oriented cavity may terminate before reaching first groove 190 and/or second groove 192. In other embodiments, either or both of the first groove 190 and second groove 192 may be absent, such that one or more circumferentially-oriented cavity (e.g., 160, 162, 164) terminates at first dam 180 and/or second dam 182.

Still referring to FIG. 4, it can be seen that first dam 180 and second dam 182 are continuous (i.e. form a substantially continuous surface) with inner arcuate edge 156 and outer arcuate edge 158 of backplate 150. Such an arrangement reduces leakage between backplate 150 and a fence 140 when the brush seal is in use.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A brush seal comprising:
   a plurality of brush seal segments, each segment including:
      an arcuate fence;
      an arcuate backplate circumferentially coextensive with the arcuate fence, the arcuate backplate including:
      a plurality of circumferentially-oriented cavities;
      a first groove adjacent a first end of the arcuate backplate and connecting at least two of the plurality of circumferentially-oriented cavities;
      a second groove adjacent a second end of the arcuate backplate and connecting at least two of the plurality of circumferentially-oriented cavities;
      a first dam along a first end of the arcuate backplate and adjacent the first groove; and
      a second dam along a second end of the arcuate backplate and adjacent the second groove;
      a plurality of brush bristles between the arcuate backplate and the arcuate fence; and
      a static member to which at least one of the plurality of brush seal segments is affixed.

2. The brush seal of claim 1, wherein the arcuate backplate further comprises:
   a first groove substantially parallel to the first end and adjacent the first dam; and
   a second groove substantially parallel to the second end and adjacent the second dam.

3. The brush seal of claim 2, wherein at least one of the first groove and the second groove is continuous with at least one of the plurality of circumferentially-oriented cavities.

4. The brush seal of claim 3, wherein both the first groove and the second groove are continuous with at least one of the plurality of circumferentially-oriented cavities.

5. The brush seal of claim 1, wherein the first dam of a first brush seal segment abuts the second dam of a second brush seal segment.

6. The brush seal of claim 1, wherein:
   the plurality of brush bristles is angled with respect to a radial axis of the arcuate backplate; and
   each of the first end and the second end of the arcuate backplate is substantially parallel to an angle of the plurality of brush bristles.

7. The brush seal of claim 1, wherein the first and second dams are continuous with an inner arcuate edge and an outer arcuate edge of the arcuate backplate.

8. A brush seal segment comprising:
- an arcuate fence;
- an arcuate backplate circumferentially coextensive with the arcuate fence, the arcuate backplate having:
- a plurality of circumferentially-oriented cavities; a first groove adjacent a first end of the arcuate backplate and connecting at least two of the plurality of circumferentially-oriented cavities;
- a second groove adjacent a second end of the arcuate backplate and connecting at least two of the plurality of circumferentially-oriented cavities;
- a first dam along a first end of the arcuate backplate and adjacent the first groove;
- a second dam along a second end of the arcuate backplate and adjacent the second groove; and
- a plurality of brush bristles between the arcuate backplate and the arcuate fence.

9. The brush seal segment of claim 8, wherein the arcuate backplate further comprises:
- a first groove substantially parallel to the first end and adjacent the first dam; and
- a second groove substantially parallel to the second end and adjacent the second dam.

10. The brush seal segment of claim 9, wherein at least one of the first groove and the second groove is continuous with at least one of the plurality of circumferentially-oriented cavities.

11. The brush seal segment of claim 10, wherein both the first groove and the second groove are continuous with at least one of the plurality of circumferentially-oriented cavities.

12. The brush seal segment of claim 8, wherein the plurality of brush bristles is angled with respect to a radial axis of the arcuate backplate and each of the first end and the second end of the arcuate backplate is substantially parallel to an angle of the plurality of brush bristles.

13. The brush seal segment of claim 8, wherein the first and second dams are continuous with an inner arcuate edge and an outer arcuate edge of the arcuate backplate.

14. An arcuate backplate for a brush seal segment comprising:
- a first end;
- a second end;
- an inner arcuate edge between the first end and the second end;
- an outer arcuate edge between the first end and the second end;
- at least one circumferentially-oriented cavity between the inner arcuate edge and the outer arcuate edge;
- a first groove adjacent a first end of the arcuate backplate and connecting at least two of the plurality of circumferentially-oriented cavities;
- a second groove adjacent a second end of the arcuate backplate and connecting at least two of the plurality of circumferentially-oriented cavities;
- a first dam along the first end and adjacent the first groove; and
- a second dam along the second end and adjacent the second groove.

15. The arcuate backplate of claim 14, further comprising:
- a first groove substantially parallel to the first end and adjacent the first dam; and
- a second groove substantially parallel to the second end and adjacent the second dam.

16. The arcuate backplate of claim 15, wherein at least one of the first groove and the second groove is continuous with the at least one circumferentially-oriented cavity.

17. The arcuate backplate of claim 16, wherein both the first groove and the second groove are continuous with the at least one circumferentially-oriented cavity.

18. The arcuate backplate of claim 14, wherein at least one of the first end and the second end is angled with respect to a radial axis of the arcuate backplate.

19. The arcuate backplate of claim 14, wherein the first dam and the second dam are continuous with the inner arcuate edge and the arcuate outer edge.

* * * * *